US006809835B2

(12) United States Patent
Suzuki

(10) Patent No.: US 6,809,835 B2
(45) Date of Patent: Oct. 26, 2004

(54) PRINTING APPARATUS WITH PAPER FEED CONTROL

(75) Inventor: Hiroshi Suzuki, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 230 days.

(21) Appl. No.: 09/983,038

(22) Filed: Oct. 22, 2001

(65) Prior Publication Data

US 2002/0061219 A1 May 23, 2002

Related U.S. Application Data

(63) Continuation-in-part of application No. 09/018,999, filed on Feb. 5, 1998.

(30) Foreign Application Priority Data

Feb. 14, 1997 (JP) ............................................. 9-29954

(51) Int. Cl.[7] ................................................ G06K 15/02

(52) U.S. Cl. .................... 358/1.18; 358/1.16; 358/1.17; 358/1.5; 358/1.8

(58) Field of Search ................. 358/1.1–1.9, 1.11–1.18; 347/40, 47, 74, 179, 235; 226/2, 3, 52, 53

(56) References Cited

U.S. PATENT DOCUMENTS

| | | | | |
|---|---|---|---|---|
| 4,194,210 | A | 3/1980 | Krause | 347/77 |
| 4,593,295 | A | 6/1986 | Matsufuji et al. | 347/41 |
| 4,920,882 | A | 5/1990 | Hoyt | 400/708 |
| 4,965,613 | A | 10/1990 | Morris et al. | 346/25 |
| 4,967,203 | A | 10/1990 | Doan et al. | 347/41 |
| 4,983,854 | A | 1/1991 | Mizuno et al. | 250/559.15 |
| 5,121,867 | A | 6/1992 | Aoyama et al. | 226/101 |
| 5,603,578 | A | 2/1997 | Furuya | 400/279 |
| 5,754,198 | A | 5/1998 | Nishikawa | 347/43 |

FOREIGN PATENT DOCUMENTS

| | | |
|---|---|---|
| JP | 2-196672 | 1/1989 |

*Primary Examiner*—King Y. Poon
(74) *Attorney, Agent, or Firm*—Oliff & Berridge, PLC

(57) ABSTRACT

In a 1-pass print operation, when the print data for a print-dot line D2 is beyond a last end L of a printable area in paper P, the data is developed while a data developing position is shifted so that the print data for the print-dot line D2 is not beyond the last print position L. An amount of feeding paper P is also changed in correspondence with the shifted data developing position. In 2-pass print operation, e.g., an interlace print operation, the print data for a print-dot line D5 or D6 is beyond the last end L, the print data is developed while a data developing position is shifted so that the print data for the print-dot line D5 or D6 is not beyond the last end L. An amount of feeding paper P is changed in correspondence with the shifted data developing position at the same time.

20 Claims, 6 Drawing Sheets

PRIOR ART

PRINTING APPARATUS WITH PAPER FEED CONTROL

This is a Continuation-in-Part of application Ser. No. 09/018,999 filed Feb. 5, 1998. The entire disclosure of the prior application is hereby incorporated by reference herein in its entirety.

BACKGROUND OF THE INVENTION

1. Field of the Invention

The present invention relates to a printing apparatus for performing printing using a recording head for ejecting ink, thereby forming a plurality of lines constituted of print-dots on a printing paper sheet fed by a paper feeding mechanism, the paper sheet having a predetermined printable area, the head being moved in a direction intersecting to a paper feed direction. More particularly, it relates to a printing apparatus capable of fully preventing the print-dot lines from being formed beyond a last end of the printable area, thereby to make the most use of the printable area in paper.

2. Description of Related Art

Heretofore, there have been known printing apparatuses, e.g., an ink jet printer, etc., for printing characters and the like on a printing paper sheet by moving a print head in a direction intersecting to a paper feed direction after feeding the printing paper by a paper feeding mechanism, thereby forming print lines each constituted of plural print-dots on the printing paper. The print head has printing portions arranged at a predetermined pitch in the paper feed direction.

In the printing apparatus of this type, a maximum area of a paper sheet in which printing can be performed (hereinafter referred to as a printable area) is determined in view of the control of a printing operation, the structural mechanism including a printing mechanism, a paper feeding mechanism, and others. It is preferable to optimize such the printable area when printing of characters and the like is performed.

The conventional printing apparatus, under the above condition, conducts a printing operation in a method shown in FIG. 6. This printing method of a conventional ink jet printer will be explained with reference to FIG. 6, which is an explanatory view schematically showing the printing method of the conventional ink jet printer.

The ink jet printer, as well known in the art, provided with an ink jet head on which a plurality of nozzle orifices are arranged in a vertical direction, performs printing on a printing paper sheet by ejecting ink droplets from the nozzle orifices onto the printing paper while moving the ink jet head in a direction intersecting to a paper feed direction.

FIG. 6(*a*) indicates a 1-pass print operation for completing printing for a printable width of nozzle orifices in a single pass operation of the ink jet head, and FIG. 6(*b*) indicates a 2-pass print operation for finishing printing for a printable width of nozzle orifices in two pass operations of the ink jet head. Here, FIG. 6(*a*) shows an example of printing a vertical line in the 1-pass print operation using the ink jet head having ten nozzle orifices. FIG. 6(*b*) shows another example of similarly printing a vertical line in the 2-pass print operation using the ink jet head having nine nozzle orifices. Note that in FIGS. 6(*a*) and (*b*) a character A indicates a paper feed direction and a character B indicates a moving direction of the ink jet head, respectively. A character L shown by a broken line indicates a last end of the printable area in the printing paper and a character E indicates a bottom edge of paper.

In the 1-pass print operation, in FIG. 6(*a*), the ink jet head ejects ink droplets from ten nozzle orifices to print a print-dot line D1 and, after the printing paper is fed in the direction A by an amount corresponding to the printable width of the nozzle orifices, prints a next print-dot line D2 connectedly with the print-dot line D1. At this time, any special control operation taking the last end of the printable area into consideration, e.g., selection of the number of nozzle orifices for ejecting ink droplets, is not conducted in the conventional ink jet printer. Accordingly, all of ten nozzle orifices are always caused to eject ink droplets on the printing paper, thus forming a print-dot line beyond the last end L of the printable area. For example, four print-dots are formed beyond the last end L in FIG. 6(*a*).

In the 2-pass print operation, the ink jet head ejects ink droplets from nine nozzle orifices to print a print-dot line D3 and, after the printing paper is fed in the direction A by an amount corresponding to half the printable width, print a next print-dot line D4 so that each print-dot of the line D4 is positioned between the adjacent print-dots of the line D3 at a half length of the line D3 as shown in FIG. 6(*b*). Concretely, the first print-dot of the line D4 is positioned between the fifth and sixth print-dots of the line D3. Similarly, after the printing paper is fed in the direction A by an amount corresponding to half the printable width, the next print-dot line D5 is printed so that each print-dot of the line D5 is positioned between the adjacent print-dots of the line D4 in a half length of the line D4. Regarding the line D5, only five print-dots among nine dots are printed to complete the 2-pass printing. As a result, a space is produced between the last print-dot of the line D5 and the last end L of the printable area in the printing paper.

Meanwhile, the last end L of the printable area in the printing paper is often set to a position capable of assuring print quality and right before the bottom edge E of the paper when it is just released from a supply roller of a paper feeding mechanism. At this time, the part beyond the last end L in the printing paper has already been released from the supply roller. It therefore may not be said that paper is supported in a proper state for a printing operation.

Consequently, in the 1-pass printing, the print-dot line D2 is printed as the lower print-dots thereof are positioned beyond the last end L, in other words, as the bottom edge E of the printing paper has been released from the supply roller. As a result, printing quality of the print-dot line D2 printed beyond the last end L can not be assured, causing a problem of extremely deteriorating a print quality of the print-dots printed near the last end L. On the other hand, when the print-dot line D2 is not printed in order to prevent a print-dot line from being formed beyond the last end L, a large space between the lowest end of the print-dot line D1 and the last end L of the printable area, resulting in an increase in the area of an unprinted portion in the printable area. It is thus impossible to optimize the printable area in the printing paper.

In the 2-pass printing, the last print-dot line D5 is required to finishing the 2-pass printing, however, the bottom edge E of the printing paper has already been released from the supply roller at the time of printing of the print-dot line D5. The printing quality of the print-dot line D5 can not be assured accordingly. When only the first through fifth print-dots of the print-dot line D4 are effectively printed, a large space is produced between the fifth print-dot of the dot line D4 and the last end L in the printing paper, which prevents the best use of the printable area.

SUMMARY OF THE INVENTION

The present invention has been made in view of the above circumstances and has an object to overcome the above problems and to provide a printing apparatus capable of surely preventing print-dot lines from being formed beyond a last end of a printable area in printing paper and of making the best use of the printable area.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a printing apparatus of this invention comprises a paper feed mechanism for feeding a printing paper in a predetermined paper feed direction, a print head having a plurality of printing portions arranged at a predetermined pitch in the paper feed direction, for forming a print-dot line formed of a plurality of print-dots on the printing paper fed by the paper feed mechanism while moving in a predetermined printing direction orthogonal to the paper feed direction, means for generating print data to be printed with the print head and supplying the generated print data to the print head, means for judging whether the print data for the print-dot line is beyond a predetermined reference position on the printing paper, first control means for controlling, when the judging means detects that the print data for the print-dot line is beyond the predetermined reference position, the data generating means to generate print data while shifting a data arrangement position so that the print data for the print-dot line is not beyond the predetermined reference position and controlling the paper feed mechanism to change a paper feed amount in corresponding to a shift of the data arrangement position, and second control means for controlling the paper feed mechanism to feed the printing paper and the print head to print in accordance with the print data generated by the data generating means.

When the above printing apparatus performs printing a desired image on a printing paper sheet by using a print head having a plurality of printing portions arranged at a predetermined pitch in a paper feed direction to which paper is to be fed by a paper feeding mechanism, a print data is first generated by a data generating means. When the data generating means generates the print data, if the judging means judges that the print data for the print-dot lines to be printed is beyond a predetermined reference position in the printing paper, the first control means controls the data generating means to generate print data while shifting the arrangement position of the data so that the print data for the print-dot lines is not beyond the predetermined reference position, and changes a feed amount of paper to be fed by the paper feeding mechanism according to a shift of the data arrangement position. Based on the above control, the print data is not generated beyond the predetermined reference position in the printing paper, so that the printing apparatus can print the print data by making the best use of the printable area.

Thereafter, under control by the second control means, the paper feeding mechanism feeds the printing paper and the print head performs printing on paper in accordance with the print data generated by the data generating means controlled by the first control means and the paper feed amount changed by the first control means.

In the above printing apparatus, when the judging means judges that the print data for print-dot lines to be printed is beyond the predetermined reference position in the printing paper, the first control means causes to generate the print data while shifting the data arrangement position so that the print data for the print-dot lines is not beyond the predetermined reference position and to change the feed amount of the printing paper to be fed by the paper feeding mechanism in correspondence with the shifting amount of the data arrangement position. This makes is possible to prevent the print data being developed beyond the predetermined reference position, thus enabling to print the print data while making the most use of the printable area in the printing paper.

According to another aspect of the invention, there is provided a printing apparatus comprising a paper feed mechanism for feeding a printing paper in a predetermined paper feed direction, a print head having a plurality of printing portions arranged at a predetermined pitch in the paper feed direction, for forming a print-dot line formed of a plurality of print-dots on the printing paper fed by the paper feed mechanism while moving in a predetermined printing direction orthogonal to the paper feed direction, a memory for storing print data to be printed with the print head, means for determining a data developing position of the print data in the memory by corresponding the print data to each of the printing portions of the print head, means for judging whether the print data for the print-dot line is beyond a predetermined reference position on the printing paper, means for generating the print data while shifting a data arrangement position so that the print data for the print-dot line is not beyond the predetermined reference position and generating paper feed data for changing a feed amount of the printing paper to be fed by the paper feed mechanism in correspondence with a shift of the data arrangement position when the judging means detects that the print data for the print-dot line is beyond the predetermined reference position, and means for controlling the paper feed mechanism to feed the printing paper based on the paper feed data generated by the data generating means and the print head to perform printing in accordance with the print data generated by the data generating means.

When the above printing apparatus performs printing a desired image on a printing paper sheet by using a print head having a plurality of printing portions arranged at a predetermined pitch in a paper feed direction to which the paper is to be fed by a paper feeding mechanism, first, the acquiring means is caused to acquire the developing position of the print data in the memory by corresponding the print data to each position of the printing portions of the print head. Sequentially, the judging means judges whether the print data for print-dot lines is beyond the predetermined reference position in the printing paper. When the print data is beyond the predetermined reference position, the data generating means generates the print data while shifting the data developing position so that the print data for the print-dot lines is not beyond the predetermined reference position and also the paper feed data for changing the feed amount of the printing paper to be fed by the paper feeding mechanism according to the shifting amount of the data developing position.

The print head is then controlled by the printing control means to perform printing in accordance with the print data generated by the data generating means after the paper feeding mechanism feeds paper based on the paper feed data generated by the data generating means.

In the above printing apparatus, when the judging means determines that the print data for the print-dot lines is beyond the predetermined reference position in the printing paper, the data generating means generates the print data for the print-dot lines by shifting the data developing position so that the print data is not beyond the predetermined reference position and changes the paper feed amount of the printing paper to be fed by the paper feeding mechanism according to the shifting amount of the data developing position. Accordingly, the print data is prevented from being developed beyond the predetermined reference position, enabling to make the most use of the printable area in the printing paper to print the print data thereon.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

Figure 1:
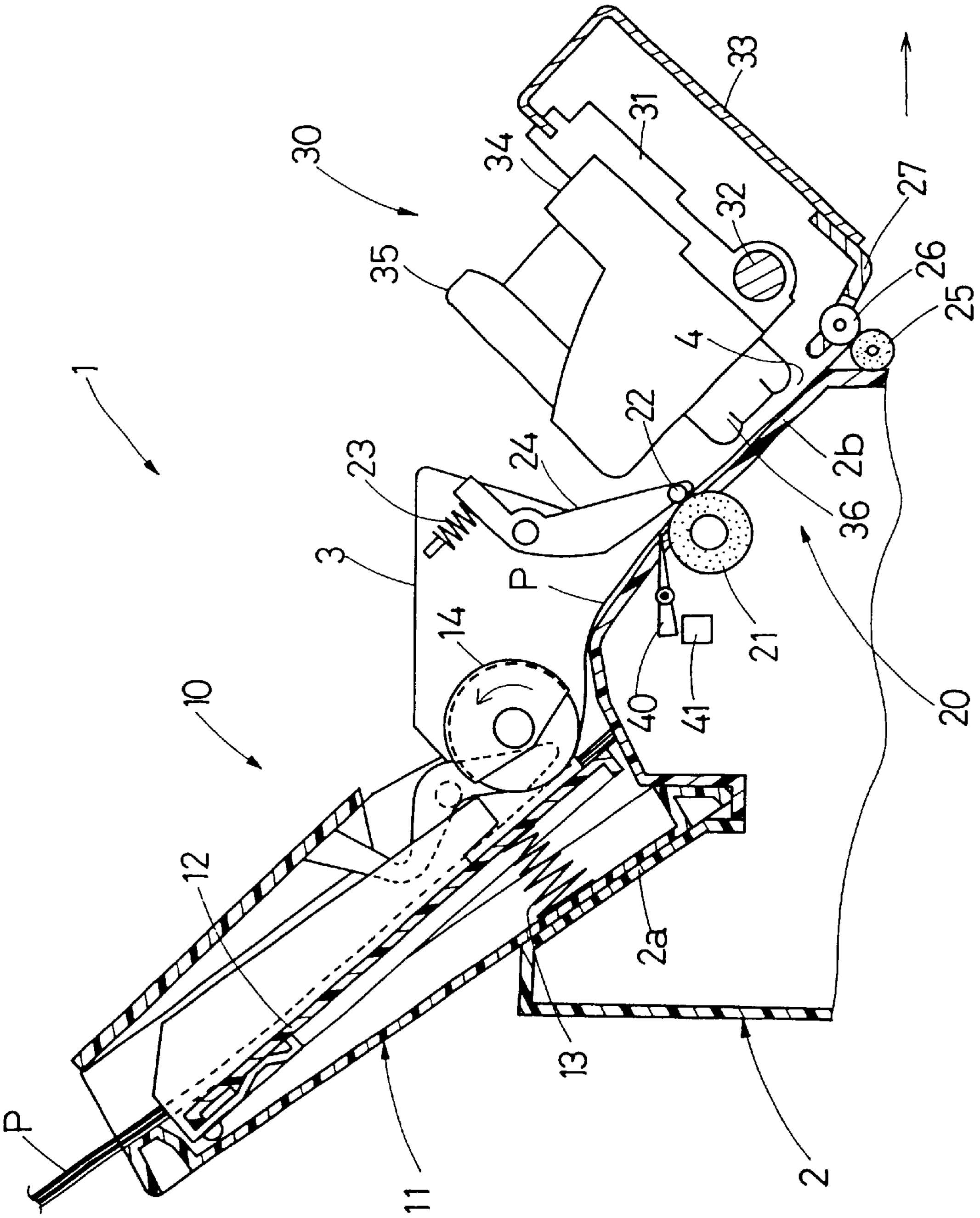
FIG. 1 is a sectional side view of an ink jet printer in an embodiment according to the invention.
Figure 2:
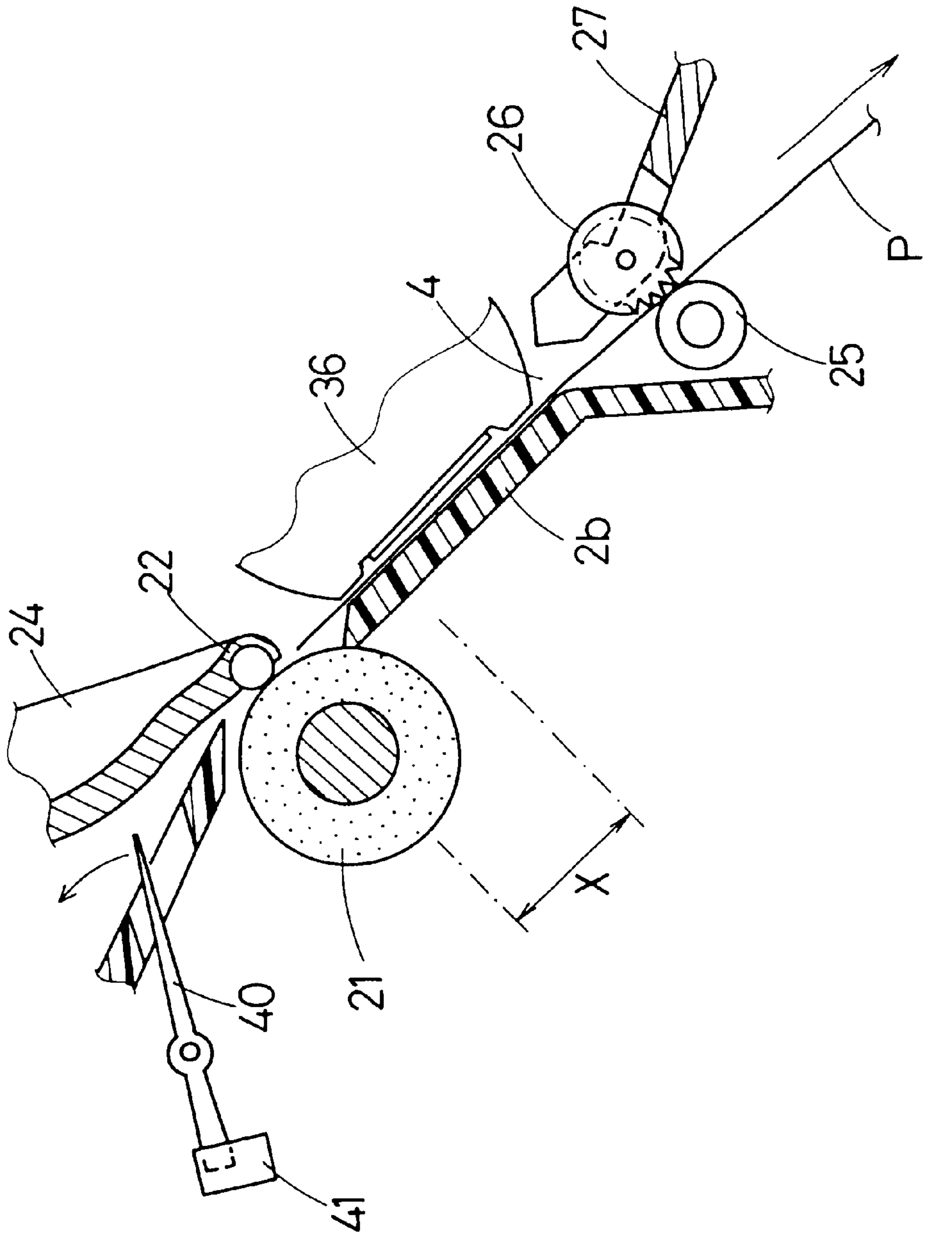
FIG. 2 is a sectional enlarged side view of an ink jet head and members around the head in the embodiment.
Figure 3:
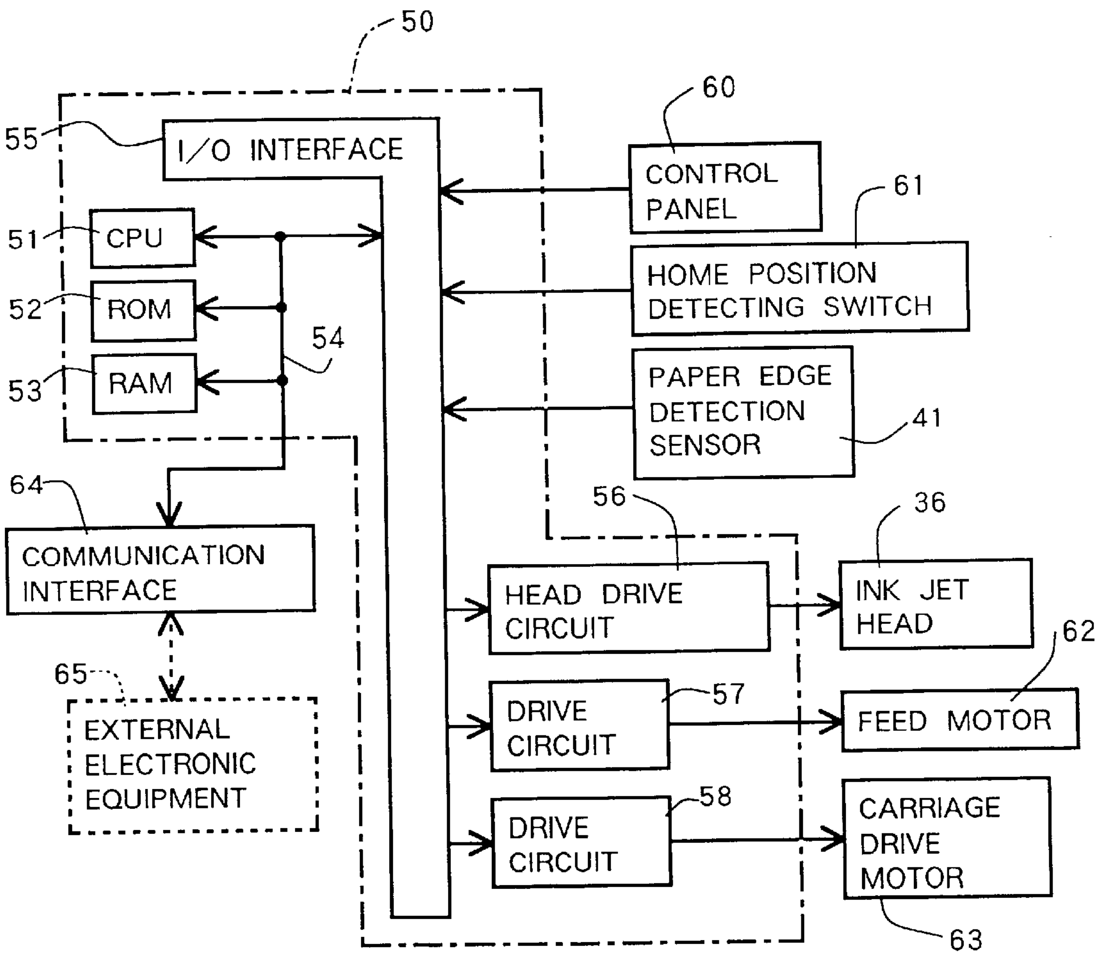
FIG. 3 is a block diagram showing a control system of the ink jet printer in the embodiment.

A detailed description of a preferred embodiment of an ink jet printer embodying a printing apparatus of the present invention will now be given referring to the accompanying drawings. First, a schematic structure of the ink jet printer in the present embodiment will be explained with reference to FIGS. 1 through 3. FIG. 1 is a sectional side view of the ink jet printer. FIG. 2 is a sectional enlarged side view of the ink jet head and around same. FIG. 3 is a block diagram of a control system of the ink jet printer.

As shown in FIG. 1, the ink jet printer 1 is provided mainly with a paper supply mechanism 10 for supplying individual sheets of printing paper P stacked on a support plate 12, a paper feeding mechanism 20 for feeding the printing paper P supplied by the paper supply mechanism 10 to a paper discharge plate (not shown) via a paper feed path 4, a printing mechanism 30 for ejecting inks on the printing paper P being fed along the path 4 to print a desired image on the printing paper P, and a drive mechanism (not shown) for driving a pick-up roller 14 of the paper supply mechanism 10 and a supply roller 21 and a feed roller 25 of the paper feeding mechanism 20.

The paper supply mechanism 10 is briefly explained below. As shown in FIG. 1, a paper cassette 11 is detachably set in a concave portion 2*a* formed at an upper plane of a back end side of a main frame 2. A back end portion of the paper support plate 12 on which a plurality of printing paper sheets P are stacked is rotatably supported on the paper cassette 11. A front end portion of the plate 12 is biased upward by a compressive coil spring 13.

Right above the front end portion of the plate 12, the pick-up roller 14 is disposed extending in a vertical direction with respect to the drawing paper, and both ends of the pick-up roller 14 are rotatably supported respectively on a pair of side wall plates 3 connected with the main frame 2.

Accordingly, the printing paper P stacked on the support plate 12 of the paper cassette 11 are pressed through the support plate 12 by the compressive coil spring 13 toward the pick-up roller 14. When the pick-up roller 14 is rotated counterclockwise through a drive mechanism (not shown in the drawing) driven by a feed motor 62 (see FIG. 3) comprising a stepping motor, only the uppermost positioned paper P of the stacked sheets is supplied by the pick-up roller 14 toward a print head 36.

Next, explained is the paper feeding mechanism 20 for feeding the paper P supplied by the paper supply mechanism 10. As shown in FIGS. 1 and 2, the paper feed path 4 along which the paper P is to be fed is formed by a guide portion 2*b* formed extending in a forward direction from the concave portion 2*a* for receiving the paper cassette. In the paper feed path 4, in an upstream side of the ink jet head 36, the supply roller 21 made of rubber is supported rotatably on the main frame 2. A sub-roller 22 which is in contact with the supply roller 21 from above is mounted rotatably at a lower end of a swing arm 24 mounted on the side wall plate 3 and biased by a compressive coil spring 23.

On the other hand, in a downstream side of the ink jet head 36 in the paper feed path 4, the feed roller 25 is rotatably mounted on the main frame 2. A sub-rowel 26 being in contact from above with the feed roller 25 is a gear-shaped roller having a plurality of radial teeth. A plurality of sub-rowels 26 are rotatably supported at predetermined intervals in a printing width direction on a plate 27 fixed to a support plate 33 for supporting a carriage 31 which will be mentioned later. The supply roller 21 and the feed roller 25 caused by the feed motor 62 to rotate clockwise in synchronism with the pick-up roller 14 driven by a drive mechanism not shown in the drawing to feed the paper P in a paper feed direction.

The printing mechanism 30 is explained below. The carriage 31 is supported on a guide rod 32 and an upper end portion of the support plate 33. The guide rod 32 is supported on a side wall not shown and disposed extending in a vertical direction with respect to the drawing paper. In a cartridge holder 34 fixedly mounted on the carriage 31, an ink cartridge 35 accommodating ink to be supplied in a printing operation is detachably set and the ink jet head 36 is attached facing the paper feed path 4.

The carriage 31 is moved reciprocatively by a carriage drive motor 63 (see FIG. 3) in a direction intersecting to the paper feed direction. In the ink jet head 36, for example, sixty-four ink jet nozzles are arranged in two divided lines, each line having thirty-two nozzles and extending in the paper feeding direction. Those sixty-four ink jet nozzles are selectively driven to eject inks in accordance with the dot pattern data to be printed.

Meanwhile, at a right upstream side of the supply roller 21, a paper detection lever 40 is rotatably supported on the main frame 2, which is swung by the paper P being fed. At a lower end portion of the paper detection lever 40 is disposed a sensor 41 constructed of an optical sensor, for detecting a swing point of the lever 40, namely, a leading edge or a bottom edge of paper P. Specifically, when the paper P is fed forward, the lever 40 is rotated clockwise as shown in FIG. 1, whereby the sensor 41 outputs a detection signal PE at an “H” level. When the bottom edge of paper P has passed, the lever 40 is returned to a home position, whereby the sensor 41 outputs a detection signal PE at an “L” level.

The control system of the ink jet printer 1 is constructed as shown in FIG. 3. The control unit 50 has a CPU 51, a ROM 52 and a RAM 53 each connected to the CPU 51 through a bus 54 such as a data bus, an input/output (I/O) interface 55, and drive circuits 56 through 58 each connected to the I/O interface 55.

To the I/O interface 55, connected are a control panel 60 provided with a power switch, other switches, and a display lamp, a switch 61 for detecting a home position of the carriage 31, and the paper edge detection sensor 41, etc. The ink jet head 36 is connected to the head drive circuit 56. The feed motor 62 is connected to the drive circuit 57. The carriage drive motor 63 is connected to the drive circuit 58. The control unit 50 can receive recording data transmitted through a communication interface 64 from an external electronic equipment 65, e.g., a host computer.

The ROM 52 stores a communication control program for receiving the recording data transmitted from the external electronic equipment 65, a control program for driving the ink jet head 36, the carriage drive motor 63, and the feed motor 62, and others in accordance with the print data developed into dot pattern data, and a print control program for controlling a printing operation mentioned later, which is characteristic of the present invention. The RAM 53 comprises a memory for storing the received recording data and a print data memory for storing the print data and, furthermore, various memories and buffers needed for communication control and printing control operations.

Figure 4:
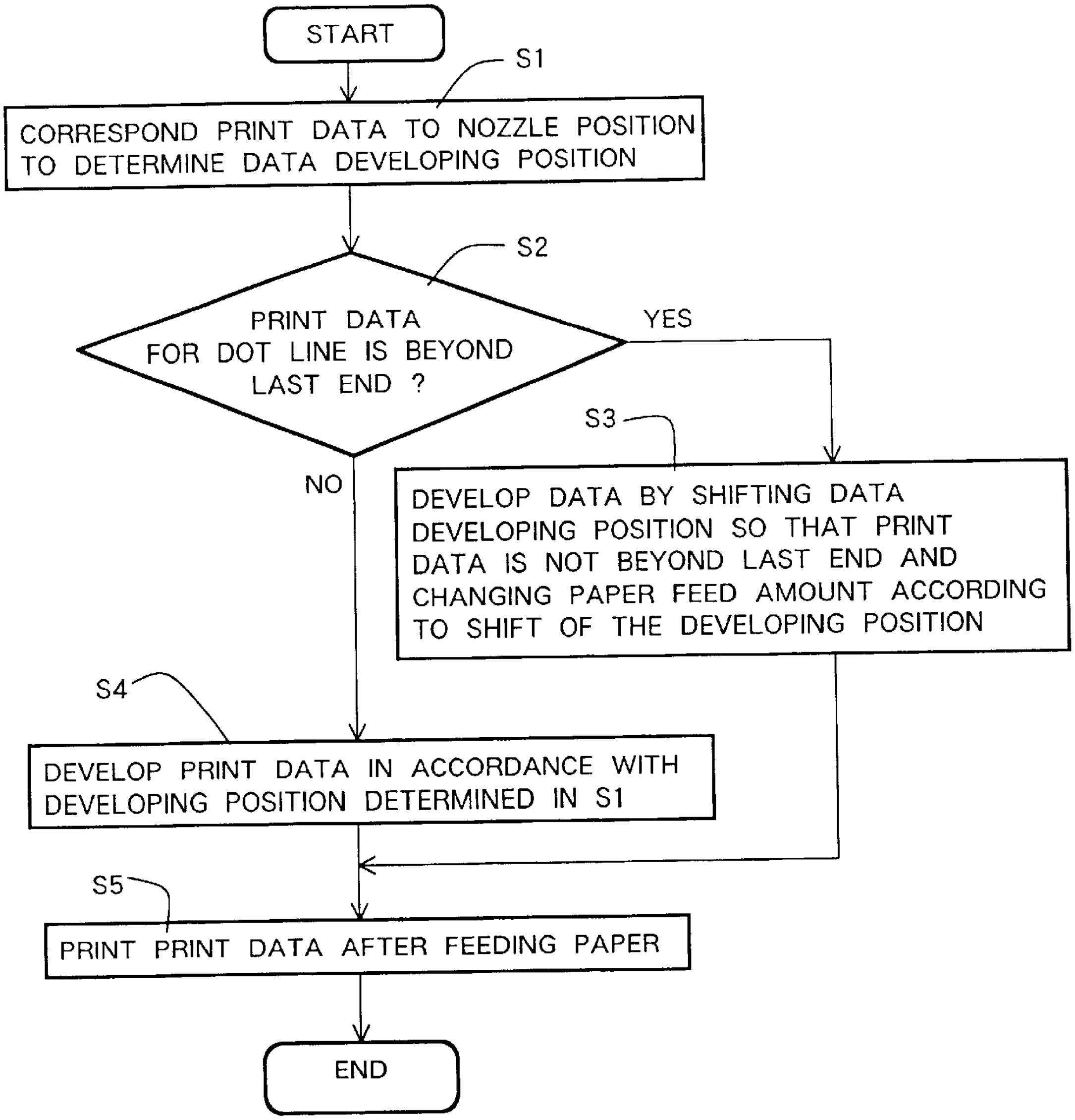
FIG. 4 is a flowchart of a print control program in the embodiment.

The printing control operation conducted in the ink jet printer 1 constructed as above will be explained with reference to FIG. 4. FIG. 4 is a flowchart of the print control program.

In FIG. 4, when the print control operation is started, the control unit 50 makes the correspondence between the position of each nozzle of the ink jet head 36 and the print data to determine the data developing position of the print data in the print data memory of RAM 53 in step 1 (hereinafter, abbreviated to S). At this time, the developing position of the print data is determined every nozzle line constructed of ink jet nozzles, namely, every print-dot line to be printed through each ink jet nozzle.

Next, in S2, in relation to determination of the developing position of the print data, it is checked whether the print data for the print-dot line is beyond the last end of the printable area in the paper P. Here, the last end is set to a position facing the ink jet nozzle existing at the most upstream side in a paper feed direction among the nozzles of the ink jet head 36 when the bottom edge of paper P is just released from a nipped state between the supply roller 21 and the driven roller 22. More specifically, in FIG. 2, the last end is set to a position apart from the bottom edge toward the printable area in the paper P by a distance X which is a distance between the nip point by the rollers 21 and 22 and the ink jet nozzle existing at the most upstream side along the paper feed direction of the ink jet head 36. Regarding whether the ink jet head 36 comes up to the last end of the printable area, for example, it is determined by adding the feed amount of paper P fed by the feed motor 62 from the time when the control unit 50 detects an H level signal outputted from the paper edge detection sensor 41, indicating that the leading edge of paper P has passed the lever 40. In this case, it is necessary to find in advance the length of paper P in the feed direction, for example, by selecting the following; the use of only the paper having a predetermined length, or the advance selection and input of the type of paper to be used, or the input of the optional length of paper to be used.

When it is judged that the print data for the print-dot line is beyond the last end of the printable area in the paper P in S2 (S2: YES), the lowest end of the undeveloped area in the print data memory is checked. The data is then developed by determining the developing position (arrangement position) while shifting it based on the lowest end of the undeveloped area so that the print data is not beyond the last end of the printable area. And in correspondence with the shifting amount of the data developing position, the feed data is generated to change the feed amount of paper P (S3). Thereafter, the flow is advanced to S5.

When it is judged that the print data for the print-dot line is not beyond the last end of the printable area (S2: NO), alternatively, in S4, the print data is developed according to the developing position of the print data determined in S1. The flow is then advanced to S5.

In S5, printing is performed using the ink jet head 36 in accordance with the print data developed in S3 and the data of the changed feed amount of paper P, or the print data developed in S4.

Figures 5A, 5B:
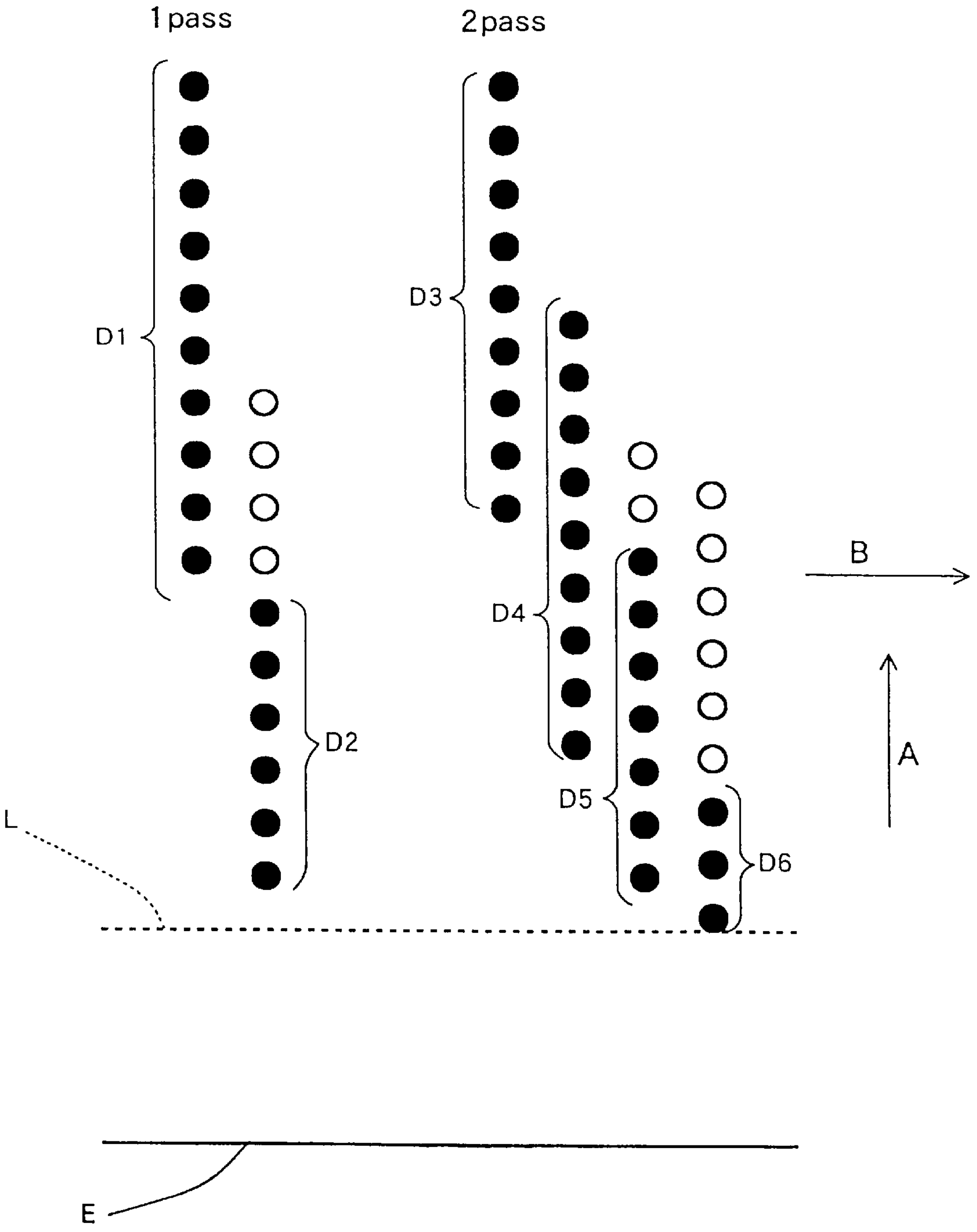
FIGS. 5(*a*) and (*b*) are explanatory views schematically showing printing methods using the ink jet printer in the embodiment.

Next, to facilitate the understanding about the print control operation, the printing method based on the print control operation is explained showing an example with reference to FIG. 5. FIG. 5 is an explanatory view schematically showing the printing method in the ink jet printer in the present embodiment.

FIG. 5(*a*) shows a 1-pass print operation for completing printing for a printable width of ink jet nozzles in a single pass operation of the ink jet head 36, and FIG. 5(*b*) indicates a 2-pass print operation for finishing printing for a printable width of ink jet nozzles in two pass operations of the ink jet head 36.

Figures 6A, 6B:
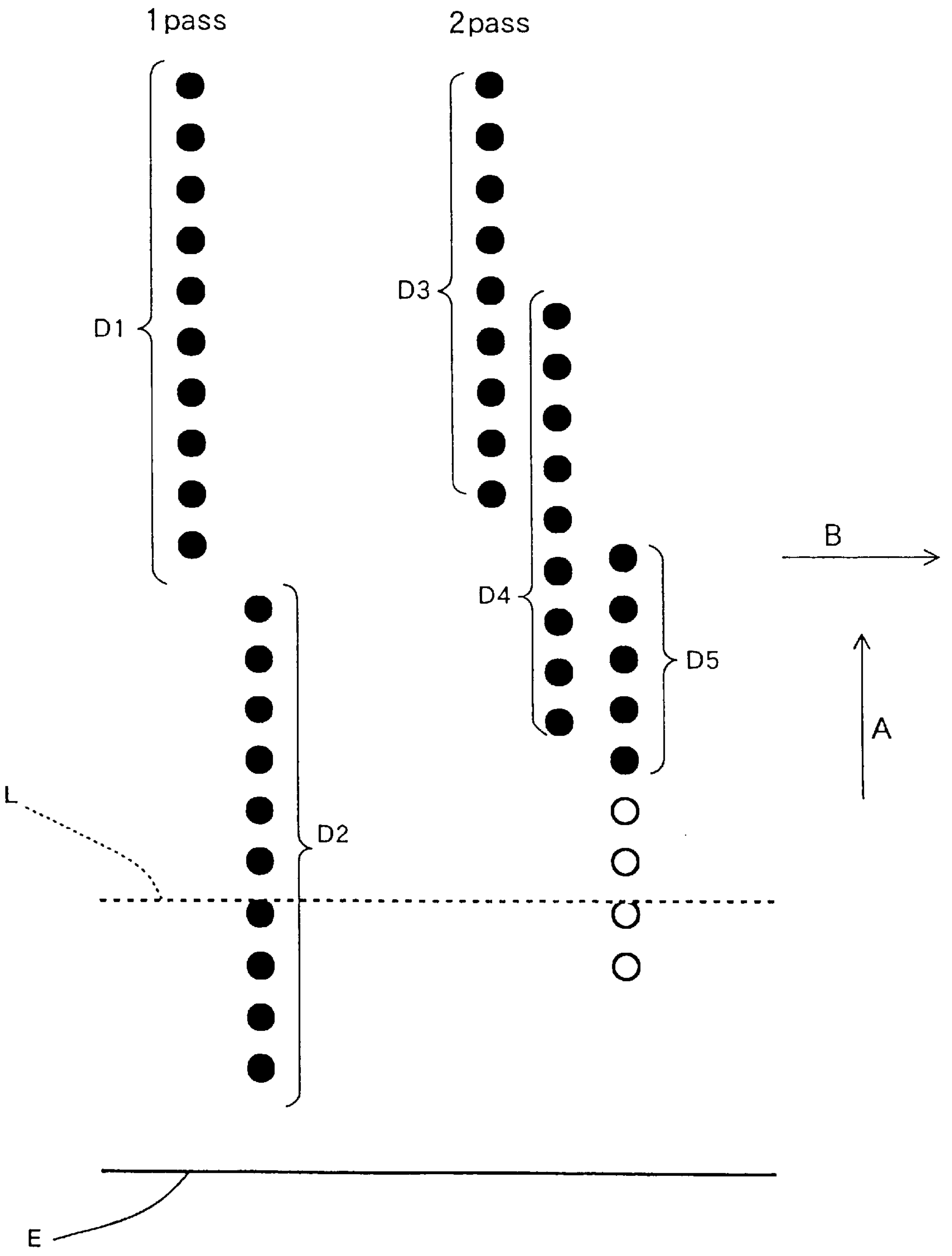
FIGS. 6(*a*) and (*b*) are explanatory views schematically showing printing methods conducted in the conventional ink jet printer.

Here, as well as in FIGS. 6(*a*) and (*b*), FIG. 5(*a*) shows an example of printing a vertical line in the 1-pass print operation using the ink jet head 36 having ten nozzles, and FIG. 5(*b*) shows another example of similarly printing a vertical line in the 2-pass print operation using the ink jet head having nine nozzles. Note that in FIG. 5 a character A indicates a paper feed direction and a character B indicates a moving direction of the ink jet head 36, respectively. A character L shown by a broken line indicates a last end of the printable area in the printing paper P and a character E indicates a bottom edge of paper P.

The 1-pass print operation is first explained hereinafter. In FIG. 5(*a*), to print the print-dot line D1 in the 1-pass printing operation, first, the control unit 50 makes the correspondence between the position of each of ten ink jet nozzles of the ink jet head 36 and the print data to determine the data developing position in the print data memory of RAM 53 (S1). Since the print data for the print-dot line D1 is not beyond the last end L (S2: NO), the print data is developed in accordance with the data developing position determined in the above manner (S4) and, after the paper P is fed in the direction A by the amount corresponding to the printable width of the ink jet nozzles, the ink jet head 36 as moving with the carriage 31 ejects inks from the ten nozzles on the paper P to print the print-dot line D1 (S5).

Sequentially, as well as above, to print the print-dot line D2, the control unit 50 makes the correspondence between the position of each of ten nozzles of the ink jet head 36 and the print data to determine the data developing position in the print data memory of RAM 53 (S1). Since this print data for the print-dot line D2 is beyond the last end L as mentioned in FIG. 6(*a*) (S2: YES), the lowest end of the undeveloped area in the print data memory is checked. The control unit 50 then develops the data by determining the developing position while shifting it based on the lowest end of the undeveloped area so that the print data is not beyond the last end L. And in correspondence with the shifting amount of the data developing position, the feed data is generated to change the feed amount of paper P (S3). Concretely, as shown in FIG. 5, the data developing position is shifted upward by four print-dots among ten print-dots and the feed amount of paper P is changed to be reduced by four print-dots. It is noted that downstream four nozzles (shown by white circles in FIG. 5) among ten nozzles are not used.

In the above case of the 1-pass print operation, when the print data for the print-dot line D2 is beyond the last end L of the printable area in the paper P, the print data is shifted so that the print data for the print dot line D2 is not beyond the last end L. The feed amount of paper P is also changed according to the shifting amount of the data developing position. Accordingly, the print data is not developed beyond the last end L. It is thus possible to print the print data by making the most use of the printable area while using even the position close to the last end L.

The last end L of the printable area in the paper P is defined in relation to the position where the printing paper P is released from the supply roller 21 and the driven roller 22. In other words, the last end L is set to the position apart at a distance X from the bottom edge E of paper P. The paper P can be held in a proper state until the ink jet head 36 comes to the last end L, which making is possible to maximize the use of the printable area to print the print data with good print quality. Note that the feed roller 25 is in contact with the paper P even after the paper P is released from the supply roller 21; however, the paper P can not be held in a stable state by only the feed roller 25 and the driven rowel 26.

A case of performing the 2-pass print operation is explained below. In FIG. 5(*b*), to print the print-dot line D3 in the 2-pass print operation, first, the control unit 50 makes the correspondence between the position of each of nine nozzles of the ink jet head 36 and the print data to determine the data developing position in the print data memory of RAM 53 (S1). Since the print data for the print-dot line D3 is not beyond the last end L (S2: NO), the print data is developed in accordance with the data developing position determined in the above manner (S4) and, after the paper is fed in the direction A by the amount corresponding to half the printable width of the ink jet nozzles, the ink jet head 36 as moving with the carriage 31 ejects inks from the nine nozzles based on the print data on the paper P to print the print-dot line D3 (S5).

Sequentially, as well as above, to print the print-dot line D4, the control unit 50 makes the correspondence between the position of each of nine nozzles of the ink jet head 36 and the print data to determine the data developing position in the print data memory of RAM 53 (S1). Since this print data for the print-dot line D4 is not beyond the last end L (S2: NO), the print data is developed in accordance with the data developing position determined in the above manner (S4) and, after the paper is fed in the direction A by the amount corresponding to half the printable width of the ink jet nozzles, the ink jet head 36 as moving with the carriage 31 ejects inks from the nine nozzles based on the print data onto paper P to print the print-dot line D4 (S5).

Furthermore, to print the print-dot line D5, the control unit 50 makes the correspondence between the position of each of nine nozzles of the ink jet head 36 and the print data to determine the data developing position in the print data memory of RAM 53 (S1). Since this print data for the print-dot line D5 is beyond the last end L as mentioned in FIG. 6(*a*) (S2: YES), the lowest end of the undeveloped area in the print data memory is checked. The control unit 50 then develops the data by determining the developing position while shifting it based on the lowest end of the undeveloped area so that the print data is not beyond the last end. And in correspondence with the shifting amount of the data developing position, the feed data is generated to change the feed amount of paper P (S3). Concretely, as shown in FIG. 5(*b*), the data developing position is shifted upward by two print-dots among nine print-dots and the feed amount of paper P is changed to be reduced by two print-dots. After the paper P is fed by the changed feed amount, the ink jet head 36 as moving with the carriage 31 ejects inks from the six nozzles to print the print-dot line D5 (S5).

Finally, to print the print-dot line D6, thereby to complete the 2-pass printing, the control unit 50 similarly makes the correspondence between the position of each of nine nozzles of the ink jet head 36 and the print data to determine the data developing position in the print data memory of RAM 53 (S1). Since this print data for the print-dot line D6 is beyond the last end L (S2: YES), the lowest end of the undeveloped area in the print data memory is checked. The control unit 50 develops the data by determining the developing position while shifting it based on the lowest end of the undeveloped area so that the print data is not beyond the last end. And in correspondence with the shifting amount of the data developing position, the feed data is generated to change the feed amount of paper P (S3). Concretely, as shown in FIG. 5(*b*), the data developing position is shifted upward by six print-dots among nine print-dots and the feed amount of paper P is changed to be reduced by six print-dots. After the paper P is fed by the changed feed amount, the ink jet head 36 as moving with the carriage 31 ejects ink from the six nozzles to print the print-dot line D6 (S5).

In the above case of the 2-pass print operation, i.e., of an interlace print operation, when each of the print data for the print-dot lines D5 and D6 is beyond the last end L of the printable area in the paper P, the print data is shifted so that the print data for the print dot line D5 or D6 is not beyond the last end L, and is developed. The feed amount of paper P is also changed according to the shifting amount of the data developing position. Accordingly, the print data is not developed beyond the last end L. It is possible to print the print data while making the most use of even the area close to the last end L of the printable area.

The interlace print operation means a printing method of performing printing by overlapping an area covered by a plurality of nozzles of the ink jet head 36 in a print pass and another area covered by the nozzles of the head 36 in another pass. For example, it is used in a banding process for eliminating a conspicuous boundary between a printing area and another printing area.

Every print pass operations in the interlace printing, the print data is developed while the developing position is shifted so that the print data for the print-dot line D5 or D6 is not beyond the last end L, and the paper feed amount is changed according to the shifting amount of the data developing position.

In this interlace printing, it is preferable to change the developing position of the print data to be printed through the ink jet head 36 and also the paper feed amount so as to converge the print data to the last end L close to the bottom edge E of paper P. This is because, in a last print pass of the interlace print operation, print-dots printed through upper nozzles of the ink jet head 36 are also in effect.

In the meantime, the last end L is determined as follows. In the above embodiment, for example, it is assumed that the size of paper P and the paper feeding direction are selected in advance. If the paper of A4-size is longitudinally used in this case, it being 297 mm in length in the paper feeding direction, regarding the point where the leading edge of paper P is detected as a reference point, it calculate how long the paper P is fed before the bottom edge E of paper P is released from the supply roller based on the distance between the paper detection lever 40 and the nip point of the supply roller 21 and the like, thereby to indirectly find the last end L. However, the invention is not limited to above. Alternatively, the last end L may be determined by directly detecting the bottom edge of paper. In this case, regarding the point where the paper bottom edge is released from the paper detection lever 4 as a reference point, it calculate how long the paper P is fed before the bottom edge E of paper P is released from the supply roller 21 based on the distance between the paper detection lever 40 and the nip point of the supply roller 21.

The present invention may be embodied in other specific forms without departing from the spirit or essential characteristics thereof. For instance, in the above embodiment, the data developing control and the paper feeding control are conducted at the last end portion of paper P in either of the 1-pass print operation or the 2-pass print operation. Alternatively, in the 1-pass print operation, it may construct to perform the data developing control and the paper feeding control at the front end portion of paper P.

In the above 2-pass printing operation, the paper feed amount after each pass in a regular printing operation is constant. In FIG. 6, for example, the feed amount after the printing of the print-dot line D3 and that after the printing of the print-dot line D4 are equal to four-point-five times as the nozzle arrangement pitch. The invention is not limited thereto and may adopt the 2-pass printing using alternately different feed amounts to feed the paper P.

Furthermore, the invention may perform any interlace print operation other than the 2-pass printing, e.g., 3-pass printing, 4-pass printing, and multi-pass more than above printing.

In the case of either printing operation; the 1-pass or 2-pass printing, not the interlace printing, if printing is conducted by shifting the print data by an amount corresponding to one nozzle so as to fill each space between adjacent nozzles, it may shift the print data and to change the paper feed amount at any position in the paper P. However, even in those cases, such the shifting or changing is preferably conducted at an upper end portion or a lower end portion in the paper P.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing apparatus, comprising:

a paper feed mechanism for feeding a printing paper in a predetermined paper feed direction, the printing paper being a cut paper with a paper edge at a most upstream side in the paper feed direction and having a predetermined printable area in which a predetermined reference position exists more downstream than the paper edge in the paper feed direction;

a print head having a plurality of printing portions arranged at a predetermined pitch in the paper feed direction, for forming a print-dot line formed of a plurality of print-dots on the printing paper fed by said paper feed mechanism while moving in a predetermined printing direction orthogonal to the paper feed direction, the print head being driven in plural-pass print operations;

data generation means for generating temporary print data;

a memory for storing the temporary print data generated by the data generation means;

means for judging whether the temporary print data for the print-dot line is beyond a position in the memory corresponding to the predetermined reference position on the printing paper;

first control means for controlling in every pass of the plural-pass print operations, when the judging means detects that the temporary print data for the print-dot line is beyond the position in the memory, the data generation means to supply conclusive print data by shifting a data arrangement position in the memory so that the temporary print data for the print-dot line is not beyond the predetermined reference position and controlling in every pass of the plural pass print operations, the paper feed mechanism to change a paper feed amount corresponding to a shift of the data arrangement position, the paper feed amount in a present pass being determined taking into consideration the paper feed amount in a previous pass; and second control means for controlling the paper feed mechanism to feed the printing paper and the print head to print in accordance with the conclusive print data supplied from the data generation means.

2. A printing apparatus according to claim 1, wherein said predetermined reference position is set to a last end of the printable area in the paper feed direction.

3. A printing apparatus according to claim 2, wherein said paper feed mechanism comprises a paper supply roller, and said last end of the printable area is set in relation to a position where the printing paper is released from the paper supply roller.

4. A printing apparatus according to claim 3, wherein said last end is set to a position facing the printing portion existing in a most upstream side in the paper feed direction among the printing portions of the print head when the printing paper is released from the paper supply roller.

5. A printing apparatus according to claim 1, wherein the predetermined reference position is set to a last end of the printable area in the paper feed direction, and the first control means controls the print head to perform an interlace print operation at a position close to the last end.

6. A printing apparatus according to claim 1, wherein the print head comprises an ink jet head having a plurality of nozzles.

7. A printing apparatus comprising:

a paper feed mechanism for feeding a printing paper in a predetermined paper feed direction, the printing paper being a cut paper with a paper edge at a most upstream side in the paper feed direction and having a predetermined printable area in which a predetermined reference position exists more downstream than the paper edge in the paper feed direction;

a print head having a plurality of printing portions arranged at a predetermined pitch in the paper feed direction, for forming a print-dot line formed of a plurality of print-dots on the printing paper fed by said paper feed mechanism while moving in a predetermined printing direction orthogonal to the paper feed direction, the print head being driven in plural-pass print operations;

a memory for storing temporary print data;

means for determining a data developing position of the temporary print data in the memory by corresponding the temporary print data to each of the printing portions of the print head;

means for judging whether the temporary print data for the print-dot line is beyond a position in the memory corresponding to the predetermined reference position on the printing paper;

data generation means for generating in every pass of the plural-pass operations conclusive print data by shifting a data arrangement position in the memory so that the temporary print data for the print-dot line is not beyond the position in the memory and generating in every pass of the plural-pass operations paper feed data for changing a feed amount of the printing paper to be fed by the paper feed mechanism in correspondence with a shift of the data arrangement position when the judging means detects that the temporary print data for the print-dot line is beyond the position in the memory, the paper feed amount in a present pass being determined taking into consideration the paper feed amount in a previous pass; and means for controlling the paper feed mechanism to feed the printing paper based on the paper feed data generated by the data generation means and the print head to perform printing in accordance with the conclusive print data generated by the data generation means.

8. A printing apparatus according to claim 7, wherein the determining means determines the data developing position of the temporary print data every dot-line which can be printed with each printing portion of the print head.

9. A printing apparatus according to claim 8, wherein the judging means judges whether the temporary print data for every print-dot line is beyond the position in the memory.

10. A printing apparatus according to claim 9, wherein said data generation means checks a lower end position of a data undeveloped area in the memory and generates the conclusive print data and the paper feed data based on the checked lower end position.

11. A printing apparatus according to claim 9, wherein when the judging means judges that the temporary print data for the print-dot line is not beyond the position in the memory, the data generation-means generates the conclusive print data based on the data developing position determined by the determining means.

12. A printing apparatus according to claim 7, wherein said predetermined reference position is set to a last end of the printable area in the paper feed direction.

13. A printing apparatus according to claim 12, wherein said paper feed mechanism comprises a paper supply roller, and said last end of the printable area is set in relation to a position where the printing paper is released from the paper supply roller.

14. A printing apparatus according to claim 13, wherein said last end is set to a position facing the printing portion existing in a most upstream side in the paper feed direction among the printing portions of the print head when the printing paper is released from the paper supply roller.

15. A printing apparatus according to claim 7, wherein the means for controlling the print head drives the print head to print a print-dot line having a predetermined width in plural-pass print operations.

16. A printing apparatus according to claim 15, wherein when the judging means detects that the temporary print data for the print-dot line is beyond the position in the memory, the means for controlling the print head controls, every pass of plural-pass print operations, the paper feed mechanism to feed the printing paper based on the paper feed data generated by the data generation means and the print head to print in accordance with the conclusive print data generated by the data generation means.

17. A printing apparatus according to claim 16, wherein the predetermined reference position is set to a last end of the printable area in the paper feed direction, and the means for controlling the print head controls the print head to perform an interlace print operation at a position close to the last end.

18. A printing apparatus according to claim 17, wherein the print head comprises an ink jet head having a plurality of nozzles.

19. A printing apparatus comprising:

a paper feed mechanism for feeding a printing paper in a predetermined paper feed direction, the printing paper being a cut paper with a paper edge at a most upstream side in the paper feed direction and having a predetermined printable area in which a predetermined reference position set to a last end thereof in the paper feed direction exists more downstream than the paper edge in the paper feed direction, the paper feed mechanism having a pair of paper supply rollers which feed the printing paper in the paper feed direction while nipping the printing paper therebetween;

a print head having a plurality of printing portions arranged at a predetermined pitch in the paper feed direction, for forming a print-dot line formed of a plurality of print-dots on the printing paper fed by said paper feed mechanism while moving in a predetermined printing direction orthogonal to the paper feed direction;

data generation means for generating temporary print data;

a memory for storing the temporary print data generated by the data generation means;

means for judging whether the temporary print data for the print-dot line is beyond a position in the memory corresponding to the predetermined reference position on the printing paper;

first control means for controlling, when the judging means detects that the temporary print data for the print-dot line is beyond the position in the memory, the data generation means to supply conclusive print data by shifting a data arrangement position in the memory so that the temporary print data for the print-dot line is not beyond the predetermined reference position and controlling the paper feed mechanism to change a paper feed amount corresponding to a shift of the data arrangement position; and second control means for controlling the paper feed mechanism to feed the printing paper and the print head to print in accordance with the conclusive print data supplied from the data generation means;

wherein the last end of the printable area is set to a position facing the printing portion existing in a most upstream side in the paper feed direction among the printing portions of the print head when the paper edge of the printing paper is released from nipping by the paper supply rollers.

20. A printing apparatus comprising:

a paper feed mechanism for feeding a printing paper in a predetermined paper feed direction, the printing paper being a cut paper with a paper edge at a most upstream side in the paper feed direction and having a predetermined printable area in which a predetermined reference position set to a last end thereof in the paper feed direction exists more downstream than the paper edge in the paper feed direction, the paper feed mechanism having a pair of paper supply rollers which feed the printing paper in the paper feed direction while nipping the printing paper therebetween;

a print head having a plurality of printing portions arranged at a predetermined pitch in the paper feed direction, for forming a print-dot line formed of a plurality of print-dots on the printing paper fed by said paper feed mechanism while moving in a predetermined printing direction orthogonal to the paper feed direction;

a memory for storing temporary print data;

means for determining a data developing position of the temporary print data in the memory by corresponding the temporary print data to each of the printing portions of the print head;

means for judging whether the temporary print data for the print-dot line is beyond a position in the memory corresponding to the predetermined reference position on the printing paper;

data generation means for generating conclusive print data by shifting a data arrangement position in the memory so that the temporary print data for the print-dot line is not beyond the position in the memory and generating paper feed data for changing a feed amount of the printing paper to be fed by the paper feed mechanism in correspondence with a shift of the data arrangement position when the judging means detects that the temporary print data for the print-dot line is beyond the position in the memory; and means for controlling the paper feed mechanism to feed the printing paper based on the paper feed data generated by the data generation means and the print head to perform printing in accordance with the conclusive print data generated by the data generation means;

wherein the last end of the printable area is set to a position facing the printing portion existing in a most upstream side in the paper feed direction among the printing portions of the print head when the paper edge of the printing paper is released from nipping by the paper supply rollers.

* * * * *